Feb. 11, 1958 R. L. WELTON ET AL 2,823,083
ROLLER BEARING FOR ROCK BIT CUTTER
Original Filed July 5, 1951 2 Sheets-Sheet 1

INVENTORS
RUSSELL L. WELTON
JAMES B. STEEN
BY
Raymond G. Mullee
ATTORNEY

Feb. 11, 1958 R. L. WELTON ET AL 2,823,083
ROLLER BEARING FOR ROCK BIT CUTTER
Original Filed July 5, 1951 2 Sheets-Sheet 2

INVENTORS
RUSSELL L. WELTON
JAMES B. STEEN
BY
Raymond G. Mullee
ATTORNEY

United States Patent Office 2,823,083
Patented Feb. 11, 1958

2,823,083

ROLLER BEARING FOR ROCK BIT CUTTER

Russell L. Welton, Compton, Calif., and James B. Steen, Fort Worth, Tex., assignors to Chicago Pneumatic Tool Company, New York, N. Y., a corporation of New Jersey Continuation of application Serial No. 235,162, July 5, 1951. This application November 5, 1954, Serial No. 466,974

2 Claims. (Cl. 308—8.2)

This invention relates to earth boring drill bits, and particularly to an improvement in roller bearing arrangements for drill bits.

This application is a continuation of our application Serial No. 235,162, filed July 5, 1951, now abandoned.

The object of this invention is to provide a drill bit with a criss-cross roller arrangement for supporting a roller cutter on a spindle, so that a distribution of the normal working pressures will be distributed over a greater area, thus reducing extreme concentration of pressure forces heretofore developed in bearing assemblies for roller cutters.

A feature of this invention is a construction and assembly wherein criss-cross roller bearings are employed, in association with friction bearings, said criss-cross roller bearings being maintained in alignment without the use of spacers.

Another feature of the invention is the utilization of criss-cross roller bearings as retainers to lock the roller cutter against axial movement on the spindle, in cooperation with a button for sustaining end thrust of the cutter.

An additional object of the invention is to increase the useful life of such drill bits without materially increasing the manufacturing cost thereof.

Other objects and features of the invention will appear more fully upon reference to the following description, taken in connection with the accompanying drawings, in which:

Fig. 1 is a front elevational view of a part of a drill bit, showing the roller cutter supported on its spindle, with portions of the spindle broken away and also shown in section, and with the cutter shown in section, and disclosing the disposition and construction of the raceways for the roller bearings and the construction of the roller cutter, whereby the roller cutter may be locked rotatively on the spindle;

In the drilling of oil and gas wells, the drill bit is subjected to severe shocks and wear which are caused by a combination of actual abrasion and impact under severe compression stresses. The bearings involved sustain an average pressure of several tons due to the weight of the drill bit and superstructure, particularly the drill stem. The maximum instantaneous force transmitted through the bearings is much higher, however, because the weight does not rest on the bearings uniformly, but is transmitted in the form of shocks partly occasioned by the uneven character of the surface of the bottom of the hole being drilled. Any lost motion occurring between the cutter and its spindle, arising from looseness in the bearings, magnifies the shocks and tends to cause a destructive hammering.

In order to retain the roller cutter on its spindle, various constructions have been employed. These are intended usually to limit any permitted axial movement of the cutter relative to its supporting spindle. In drill bits employing ball bearings for retainers, to hold the roller cutter on its spindle, the bearing balls may become deformed or damaged to such an extent that they fail to retain the cutter. When the cutter becomes detached from its spindle, further drilling is inhibited, and an expensive "fishing" operation is required, all of which occasionally results in a lost well.

In the case of such ball bearings, the pressure forces on the bearing balls and on their associated raceways are necessarily concentrated in relatively small areas with consequent high stress concentration. In order to obviate the occurrence of highly concentrated stresses, and to reduce the stress intensity that may be developed on bearing elements and on their associated surfaces, it is proposed, as a feature of this invention, to utilize criss-cross roller bearings, suitably disposed in relation to friction bearings to absorb the pressure forces that may be developed in various directions during operation with some of said roller bearings being disposed also to serve as retainers to lock the associated roller cutter on its spindle.

The pressure force that would normally be confined to the small neighborhood area of a theoretical point contact of a ball bearing is of relatively high intensity. On the other hand, the rectangular area of the neighborhood adjacent a theoretical line contact of a roller bearing provides an increased area over which to distribute the pressure force during operation, with a consequent diminution of the relative or unit pressure intensity.

In the present combination support assembly, criss-cross roller bearings are disposed and employed to provide a reduction of pressure intensities, and to establish and maintain a more stable assembly of the cutter on its spindle and to resist end thrust forces of the cutter against the spindle.

Figure 1:
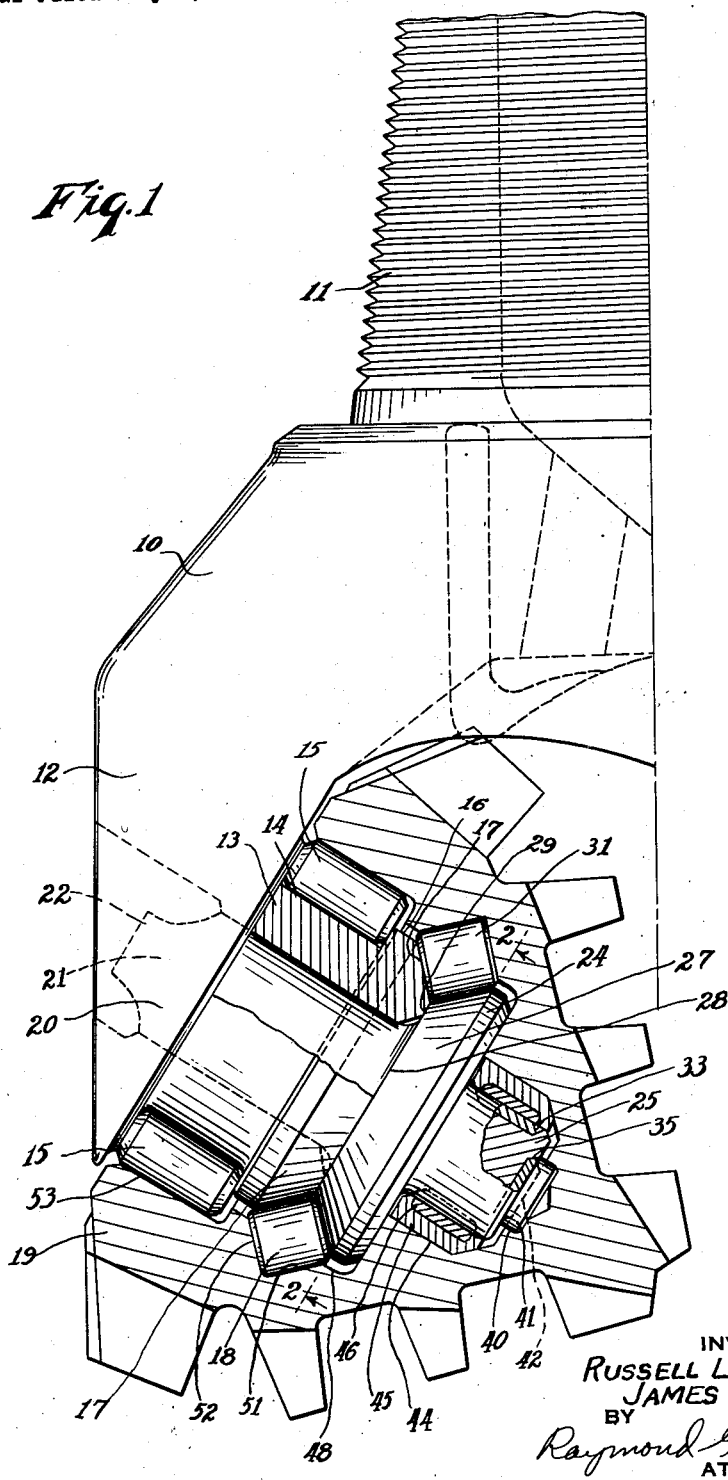

The illustrative embodiment of the invention shown in Fig. 1 comprises a bit head 10 provided with an externally threaded top 11 for connection to a suitable drill collar which drives the bit rotatably about a vertical axis. The lower part of the head 10 is a rigid body 12 provided with an integral sleeve section 13 to serve as a support for the cutter pin, and having on its outer surface 14 a cylindrical raceway for roller bearings 15. The front or forward portion of the integral sleeve section 13 is provided with a flange 16 and a front face 17, of frusto-conical shape, to serve as a raceway for one group of criss-cross roller bearings 18.

The integral sleeve section 13 serves on its outer surface as a stationary shaft upon which the cone shaped roller cutter 19 may be rotatably supported. The integral section 13 also serves to receive and support a cutter pin 20, in a rigid press fit, to provide a rigid extension for additional support at other points for the roller cutter 19.

The cutter pin 20 is provided with a rear stem 21 having an end or tail piece 22 which is adapted to be welded or brazed, or otherwise secured in place, on the rigid body structure 12 of the bit head. The pin 20 is also provided with a flange 24 and with a front extension or pilot portion 25. The rear of the flange 24 is provided with a frusto-conical surface 27 and an annular truncated face 28 in a transverse plane. In assembled condition, the annular truncated face 28 sits tightly against a similar conjugate face or surface 29 at the front edge of the flange 16 of the integral annular shaft section 13. The frusto-conical surface 27 of the flange on the cutter pin 20 serves as a raceway for the second group of the criss-cross row of roller bearings 31, which are similar to bearings 18 in size and shape, but are arranged and disposed to roll on the raceway 27; the rollers 18 are disposed and arranged to roll on the raceway 17.

The periphery of the pilot portion 25 of the cutter pin 20 is covered with a layer or facing of hard metal, such as Stellite or other similar hard alloy, which is then accurately machined and ground to concentricity with the cutter pin 20 to constitute a bearing ring 33 to resist wear on the pilot portion 25 as a shaft for the cutter. The front end face of the pilot portion 25 is similarly covered with a layer of hard wear-resisting material applied to form an integral disc 35 to resist wear and withstand heavy axial thrust forces that will be encountered during operation. By reason of the tight fit of the cutter pin 20 in the integral annular shaft section 13, and the subsequent welding or equivalent anchoring of the tail piece of the cutter pin 20 in the rigid supporting body structure 12, the cutter pin 20 and the encircling supporting shaft section 13 constitute, in effect, a rigid unitary spindle for rotatably supporting the roller cutter 19.

The cutter 19 is generally of conical outer shape with rows of external teeth, and generally hollow inside, with surfaces of revolution suitably disposed on the inside of the conical shell body to provide raceways and bearing surfaces for the respective bearings that are employed to support the cutter.

The cutter 19 is provided internally with a front bore 40 within which is press fitted an end thrust button 41, formed with a facing insert 42 of hard, wear-resisting metal for engaging the similar hard, wear-resisting metal disc 35 at the front end face of the pilot portion 25 of the cutter pin 20. In a concentric counterbore 44 is secured by means of a press fit, a bushing or sleeve bearing 45. This sleeve bearing 45 may be made of homogeneous composition of hard metal throughout, to withstand wear from the pilot portion 25. Alternatively the sleeve bearing 45 may be of tough load-sustaining metal to which an annular facing surface ring 46 of hard, wear-resisting metal, such as Stellite or other similar hard, wear-resisting alloy, is applied to engage the hard metal bearing ring 33 on the pilot shaft portion 25 of the cutter pin 20.

An additional larger counterbore 48 provides clearance between the edge of the flange 24 and the roller cutter during operation.

As illustrated in Fig. 1, the drill bit head that is shown represents only one of three spindle and cutter assemblies. The other two are symmetrically arranged around the vertical center line or axis of the drill head, and are unnecessary to an illustration of the present invention. The manner in which the teeth of the respective cutter interfit with each other is well understood and needs no further explanation.

Upon reference to Fig. 1, it will be clear that a substantial part of the weight of the drill and pipe superstructure will be impressed on the bottom rollers 15 and 18, and on the sleeve bearing 45.

In order to provide a suitable raceway for the rollers 18, to cooperate with raceway 17, an inner surface 51 is accurately machined on the inside of the cutter cone 19. An adjacent raceway 52 is also provided on the inner surface of the cutter cone 19, at right angle to the raceway 51, to accommodate the rollers 31 in cooperation with raceway 27.

At the base of the cutter cone, on the inner surface a raceway 53 is provided for the roller bearings 15.

Figure 2:
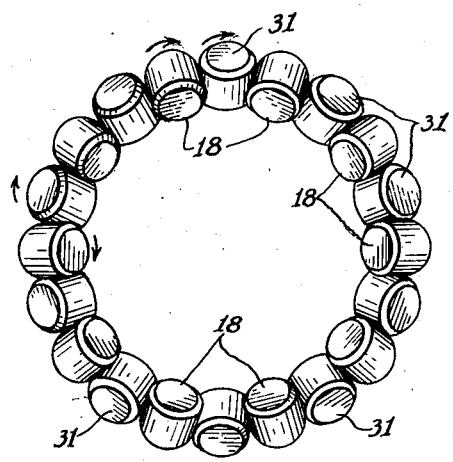
Fig. 2 is a co-axial end view, in perspective, of the criss-cross roller bearings used in the drill bit of the invention, illustrating the criss-cross arrangement wherein two groups of bearings are alternately disposed in a row without the use of bearing spacers, and showing alternate orientation in opposite directions.

As shown in Fig. 1, and as indicated particularly in Fig. 2, the rollers 18 and 31 from the two groups are alternately arranged in criss-cross formation, and without the use of bearing spacers. The axes of the rollers 18 are oriented to point forward and converge towards the front of the spindle axis, while the axes of the rollers 31 point towards the rear to converge on the axis of the spindle towards the back end of the spindle. In order to permit free rolling of the two sets of rollers 18 and 31, the dimensions of the rollers are made such that their diameters are slightly larger than their axial lengths. With such dimensional relationship, sufficient axial clearance is provided adjacent one end of each roller to permit a very slight axial adjustment by each roller to minimize axial end thrust friction without permitting the rollers to become askew.

Figure 3:
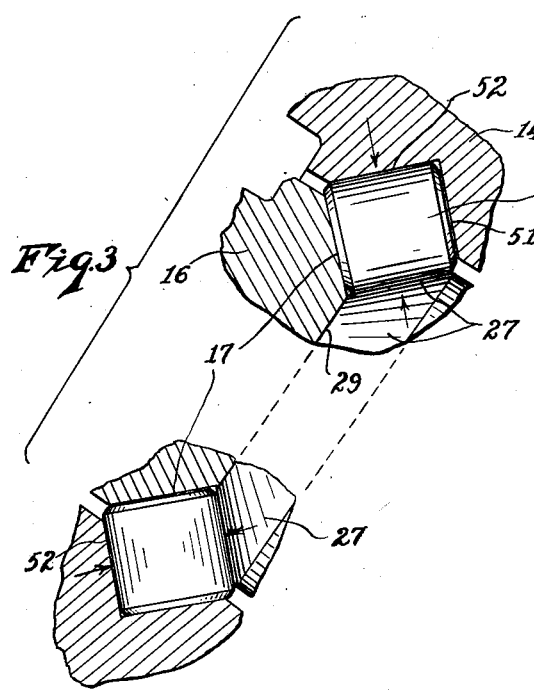
Fig. 3 is a fragmentary sectional view in the same plane as Fig. 1, showing two of the criss-cross rollers in engagement with cooperating raceways of the spindle and of the cutter respectively, and serving mainly as retainers.

As shown in Fig. 3, for example, the rollers 31 roll on their respective raceways 27 and 52, with slight spacing from the surface 51. Consequently, very little friction pressure could develop at the surface 17 since the roller could readily adjust itself away from surface 17 to reduce its friction pressure against that surface 17, as it rolls between raceways 27 and 52.

Figure 4:
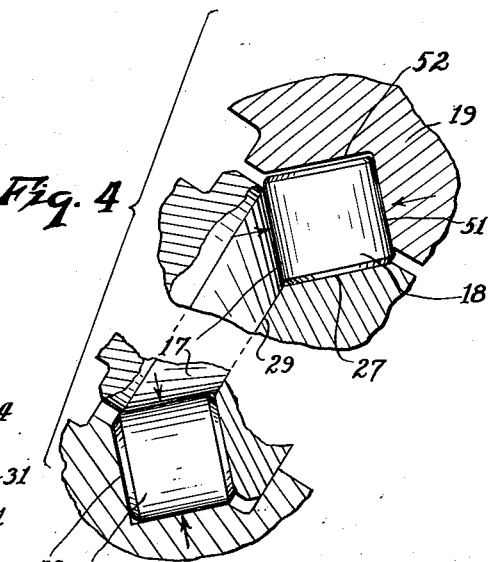
Fig. 4 is a view similar to Fig. 3, of two rollers in the second set diametrically disposed on their raceway and illustrating axial disposition rotated at 90 degrees from the roller shown in Fig. 3, in sustaining and serving mainly to aid the pressure forces that are due to the weight of the drill.

Similarly, in Fig. 4, the rollers 18 are shown with a slight space between one end and the raceway 52, which permits a roller 18 to adjust itself away from surface 27 to minimize any friction pressure that might develop between the roller 18 and that surface 27. In the case of rollers 18, as shown in Fig. 4, those rollers when in the lower part of their orbit engage their respective raceways 17 and 51 to sustain the heavy vertical pressure forces due to the weight of the drill.

Due to the conical shape of the two raceways 17 and 51, for the rollers 18, those rollers will traverse a longer path at one end than at the other, and they will have a slight tendency to become askew. However, as the rollers move up from their lowermost or supporting position to their uppermost or relieved position, the side pressure forces on the rollers decrease, and the rollers may readily readjust themselves back into proper position.

Figure 5:
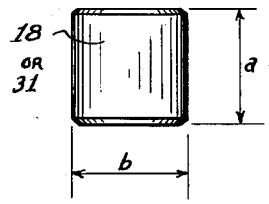
Fig. 5 is a front elevational view of a unit roller of the type illustrated in the preceding figures.

As shown in Fig. 5, the axial length of the roller 18 or 31 is a dimension $a$ which should be less than the diameter indicated by the dimension $b$, by only a short distance to provide the freedom for axial adjustment illustrated in Figs. 3 and 4.

By use of the roller type bearings 18, with their larger area of contact, the pressure intensity developed on the roller surfaces and on the associated raceways is considerably reduced below the concentrated pressure intensities heretofore developed.

Similarly, the roller bearing provides a tighter and closer fitting assembly of the cone cutter on the spindle. Consequently, there is less looseness of the kind that permits shock impacts and resulting sudden stress concentrations that progressively aggravate the looseness. The tightness provided by the present structure thus assures a longer operating life for the cutter assembly.

The criss-cross arrangement of the roller bearings permits both the weight-sustaining bearings 18 and the retainers 31 to be disposed within the same orbit space within the cone cutter that from its nature is crowded by internal bearings. Bearings 18 are thus available to readily absorb, and to brace the cutter against pressures in vertical directions, while the bearings 31 continuously serve as retainers to lock the cutter on its spindle to prevent axial separating movement.

The total effect of the criss-cross roller bearings 18 and 31, together with rollers 15 and the sleeve bearing 45, is to provide a bearing assembly for the cutter on its spindle that has a substantial total surface area to sustain the weight of the drill structure, with a consequent distribution of the weight over that area and a reduction of individual bearing surface stresses.

Any slight looseness that might otherwise be noticeable is even further minimized by the sleeve bearing 45 and the end thrust button 41, both of which are in direct frictional contact with the spindle.

Moreover, inwardly directed end pressure of the cone against the spindle, finds a stable bracing structure in the virtual truncated cone outlined by the end thrust button 41 and the roller bearings 18, with substantial pressure sustaining areas provided by the top and the bototm areas of the cone thus outlined.

The drilling action is clockwise in the forward drilling direction. The roller bearings 18 and 31 therefore rotate about their respective axes, in the clockwise directions, as indicated by the small arrows in Fig. 2, and revolve clockwise around the spindle, viewed from the free end of the spindle. Each cone cutter also rotates clockwise around its spindle, viewed from its apex.

What is claimed is:

1. An earth boring drill comprising in combination a head portion having an integral sleeve section one end of which has a roller raceway formed thereon, a spindle affixed to the head portion and having a flange with a roller raceway formed thereon, said raceways in combination forming a V-shaped roller raceway, a conical roller cutter surrounding the spindle and sleeve section and having a V-shaped roller raceway disposed opposite to the V-shaped roller raceway of the sleeve section and spindle, roller bearing means disposed between the sleeve section and the roller cutter the axis of each roller being parallel to the axis of the spindle, a criss-cross roller bearing arrangement disposed in the V-shaped roller raceways, said criss-cross roller bearing arrangement adapted to maintain the roller cutter in position about the spindle and sleeve section and having a first set of rollers with their axis converging in a point rearwardly in the axis of the spindle and a second set of rollers alternately disposed in contacting relationship with said first set of rollers and having their axis converging in a point forwardly in the axis of the spindle, the rollers of both sets being identical, the body of each roller being characterized by a uniform and greater diameter than length and as having flat ends at right angles to the body, the flat ends of the first set of rollers being in close proximity to an opposed wall of each raceway and the peripheral surfaces of the said first set of rollers bearing on the remaining opposed walls of the raceways, and the second set of rollers having an arrangement in the raceways reverse to that of the first set of rollers.

2. In an earth boring drill including a supporting spindle and a surrounding cone cutter rotatably retained on the spindle; a common raceway of rectangular cross-section formed between the spindle and the cutter by a peripheral V-groove in the spindle and a complementary groove in the cutter; a series of rollers disposed in the raceway, each roller having a cylindrical body, flat ends at right angles thereto, and a diameter slightly greater than the length of the body; alternate rollers of the series being disposed at right angles to the others, the flat ends of the alternate rollers being in close proximity to a pair of opposed walls of the raceway while the cylindrical surfaces of the other rollers being in bearing relation to said opposed walls, and the reverse condition existing between the series of rollers and the other pair of opposed walls of the raceway, whereby the cutter is rotatably supported and retained on the spindle by the series of rollers in the common raceway, the cylindrical body of every other roller serving to support a downwardly acting load of the cutter on the spindle and the cylindrical bodies of the other rollers serving to absorb upwardly acting thrusts of the cutter upon the spindle.

References Cited in the file of this patent

UNITED STATES PATENTS

| | | |
|---|---|---|
| 1,909,128 | Scott | May 16, 1933 |
| 1,972,256 | Behnke | Sept. 4, 1934 |
| 2,126,041 | Reed | Aug. 9, 1938 |
| 2,177,331 | Reed | Oct. 24, 1939 |
| 2,230,442 | Arms | Feb. 4, 1941 |
| 2,351,357 | Miller | June 13, 1944 |
| 2,430,359 | Messinger | Nov. 4, 1947 |
| 2,507,776 | Francis | May 16, 1950 |
| 2,513,634 | Francis | July 4, 1950 |

FOREIGN PATENTS

| | | |
|---|---|---|
| 147,711 | Austria | Nov. 10, 1936 |
| 973,265 | France | Feb. 9, 1951 |